US010273819B2

(12) United States Patent
Propheter-Hinckley et al.

(10) Patent No.: US 10,273,819 B2
(45) Date of Patent: Apr. 30, 2019

(54) CHAMFERED STATOR VANE RAIL

(71) Applicant: UNITED TECHNOLOGIES CORPORATION, Farmington, CT (US)

(72) Inventors: Tracy A. Propheter-Hinckley, Manchester, CT (US); Roger Gates, West Hartford, CT (US); David Richard Griffin, Tolland, CT (US); James Tilsley Auxier, Bloomfield, CT (US)

(73) Assignee: United Technologies Corporation, Farmington, CT (US)

( * ) Notice: Subject to any disclaimer, the term of this patent is extended or adjusted under 35 U.S.C. 154(b) by 471 days.

(21) Appl. No.: 15/246,875

(22) Filed: Aug. 25, 2016

(65) Prior Publication Data
US 2018/0058230 A1 Mar. 1, 2018

(51) Int. Cl.
*F01D 9/04* (2006.01)
*F01D 25/12* (2006.01)
*F01D 25/24* (2006.01)

(52) U.S. Cl.
CPC ............. *F01D 9/041* (2013.01); *F01D 9/042* (2013.01); *F01D 25/12* (2013.01); *F01D 25/246* (2013.01); *F05D 2220/32* (2013.01); *F05D 2240/11* (2013.01); *F05D 2240/12* (2013.01); *F05D 2240/55* (2013.01); *F05D 2240/81* (2013.01); *F05D 2250/184* (2013.01); *F05D 2250/292* (2013.01); *F05D 2250/712* (2013.01); *F05D 2250/713* (2013.01); *F05D 2260/205* (2013.01);

(Continued)

(58) Field of Classification Search
CPC .......... F01D 9/041; F01D 9/042; F01D 25/12; F01D 25/246; F05D 2220/32; F05D 2240/55; F05D 2240/12; F05D 2240/11; F05D 2240/81; F05D 2250/184; F05D 2250/292; F05D 2250/712; F05D 2250/713; F05D 2260/205; F05D 2300/175; Y02T 50/676
See application file for complete search history.

(56) References Cited

U.S. PATENT DOCUMENTS 6,164,656 A    12/2000  Frost
6,183,192 B1 *  2/2001  Tressler ................ F01D 5/189
                                              415/115

(Continued)

FOREIGN PATENT DOCUMENTS

EP    1039096    9/2000
EP    1384858    1/2004
EP    2369139    9/2011

OTHER PUBLICATIONS

European Patent Office, European Search Report dated Feb. 2, 2018 in Application No. 17180864.5-1006.

*Primary Examiner* — Igor Kershteyn
(74) *Attorney, Agent, or Firm* — Snell & Wilmer, L.L.P.

(57) ABSTRACT

A chamfered stator vane rail is provided. The chamfered stator vane rail may comprise a forward rail and an aft rail axially opposite the forward rail. The aft rail may comprise a leading edge and a trailing edge located axially opposite and aft of the leading edge. The aft rail may comprise a chamfered edge on a radially outer surface. The chamfered edge may be oriented at an angle relative to an axis.

17 Claims, 7 Drawing Sheets

(52) U.S. Cl.
CPC ....... *F05D 2300/175* (2013.01); *Y02T 50/676* (2013.01)

(56) References Cited

U.S. PATENT DOCUMENTS

| | | | |
|---|---|---|---|
| 8,360,716 B2* | 1/2013 | Bergman | F01D 9/02 415/190 |
| 2004/0018081 A1* | 1/2004 | Anderson, Jr. | F01D 25/14 415/108 |
| 2006/0045745 A1 | 3/2006 | Synnott | |
| 2012/0128465 A1 | 5/2012 | Burdgick | |
| 2013/0209248 A1 | 8/2013 | Ring | |
| 2013/0209249 A1* | 8/2013 | Langlois | F01D 9/042 415/209.3 |
| 2014/0241874 A1* | 8/2014 | Rioux | F01D 25/246 415/209.4 |
| 2016/0169037 A1 | 6/2016 | Lefebvre | |

* cited by examiner

CHAMFERED STATOR VANE RAIL

FIELD

The present disclosure relates to gas turbine engines, and more specifically, to a chamfered stator vane rail for gas turbine engines.

BACKGROUND

Gas turbine engines typically include at least a compressor section to pressurize inflowing air, a combustor section to burn a fuel in the presence of the pressurized air, and a turbine section to extract energy from the resulting combustion gases. One or more sections of the gas turbine engine may include a plurality of vane assemblies having vanes interspersed between rotor assemblies that carry the blades of successive stages of the section. Gas turbine engines may have various secondary airflow streams to provide cooling air to gas turbine engine components including stator vane assemblies and/or rotor assemblies. Losses in delivery of cooling air may have a negative effect on engine fuel burn, performance/efficiency, and component durability.

SUMMARY

In various embodiments, a stator vane rail is disclosed. The stator vane rail may comprise a forward rail and an aft rail. The aft rail may be located axially opposite the forward rail. The aft rail may comprise an axis defining a perpendicular direction from the aft rail. The aft rail may comprise a leading edge and a trailing edge located axially opposite the leading edge. The aft rail may comprise a chamfered edge coupled to the leading edge, wherein the chamfered edge comprises a radially outer surface of the aft rail.

In various embodiments, the chamfered edge of the stator vane rail may comprise a substantially flat surface. In various embodiments, the chamfered edge of the stator vane rail may comprise a curved surface extending in a radial direction away from the axis. In various embodiments, the chamfered edge of the stator vane rail may be oriented at an angle of about 45° to about ° 60 relative to the axis. In various embodiments, the chamfered edge of the stator vane rail may be oriented at an angle of about 15° to about 45° relative to the axis. In various embodiments, the chamfered edge may comprise a bow tied surface. In various embodiments, the chamfered edge may comprise a sinusoidal surface.

In various embodiments, a stator vane assembly is disclosed. The stator vane assembly may comprise a stator vane, and ID stator vane rail, and an OD stator vane rail. The stator vane may have a first end opposite a second end. The ID stator vane rail may be coupled to the first end of the stator vane. The OD stator vane rail may be coupled to the second end of the stator vane. The OD stator vane rail may comprise an OD forward rail and an OD aft rail located axially opposite the OD forward rail. The OD aft rail may comprise an OD axis defining a perpendicular direction from the OD aft rail. The OD aft rail may comprise an OD leading edge and an OD trailing edge located axially opposite the OD leading edge. The OD aft rail may comprise an OD chamfered edge coupled to the OD leading edge, wherein the OD chamfered edge comprises a radially outer surface of the OD aft rail.

In various embodiments, the ID stator vane rail of the stator vane assembly may comprise an ID forward rail and an ID aft rail located axially opposite the ID forward rail. The ID aft rail may comprise an ID axis defining a perpendicular direction from the ID aft rail. The ID aft rail may comprise an ID leading edge and an ID trailing edge located axially opposite the ID leading edge. The ID aft rail may comprise an ID chamfered edge coupled to the ID leading edge, wherein the ID chamfered edge comprises a radially outer surface of the ID aft rail, and wherein the ID chamfered edge is oriented at an angle of about 45° to about 60° relative to the ID axis. In various embodiments, the OD chamfered edge of the OD stator vane rail may comprise a curved surface extending in a radial direction away from the OD axis. In various embodiments, the OD chamfered edge of the OD stator vane rail may be oriented at an angle of about 45° to about ° 60 relative to the OD axis. In various embodiments, the OD chamfered edge may comprise a bow tied surface. In various embodiments, the OD chamfered edge may comprise a sinusoidal surface.

In various embodiments, a gas turbine engine is disclosed. The gas turbine engine may comprise a turbine section and a stator vane assembly in the turbine section. The stator vane assembly may comprise a stator vane, and ID stator vane rail, and an OD stator vane rail. The stator vane may have a first end opposite a second end. The ID stator vane rail may be coupled to the first end of the stator vane. The OD stator vane rail may be coupled to the second end of the stator vane. The OD stator vane rail may comprise an OD forward rail and an OD aft rail located axially opposite the OD forward rail. The OD aft rail may comprise an OD axis defining a perpendicular direction from the OD aft rail. The OD aft rail may comprise an OD leading edge and an OD trailing edge located axially opposite the OD leading edge. The OD aft rail may comprise an OD chamfered edge coupled to the OD leading edge, wherein the OD chamfered edge comprises a radially outer surface of the OD aft rail.

In various embodiments, the ID stator vane rail of the stator vane assembly may comprise an ID forward rail and an ID aft rail located axially opposite the ID forward rail. The ID aft rail may comprise an ID axis defining a perpendicular direction from the ID aft rail. The ID aft rail may comprise an ID leading edge and an ID trailing edge located axially opposite the ID leading edge. The ID aft rail may comprise an ID chamfered edge coupled to the ID leading edge, wherein the ID chamfered edge comprises a radially outer surface of the ID aft rail, and wherein the ID chamfered edge is oriented at an angle of about 45° to about 60° relative to the ID axis. In various embodiments, the OD chamfered edge of the OD stator vane rail may comprise a curved surface extending in a radial direction away from the OD axis. In various embodiments, the OD chamfered edge of the OD stator vane rail may be oriented at an angle of about 45° to about ° 60 relative to the OD axis. In various embodiments, the OD chamfered edge may comprise a bow tied surface. In various embodiments, the gas turbine engine may further comprise an OD leading edge seal located forward the OD leading edge. In various embodiments, the gas turbine engine may further comprise an OD trailing edge seal located aft the OD trailing edge.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 1:
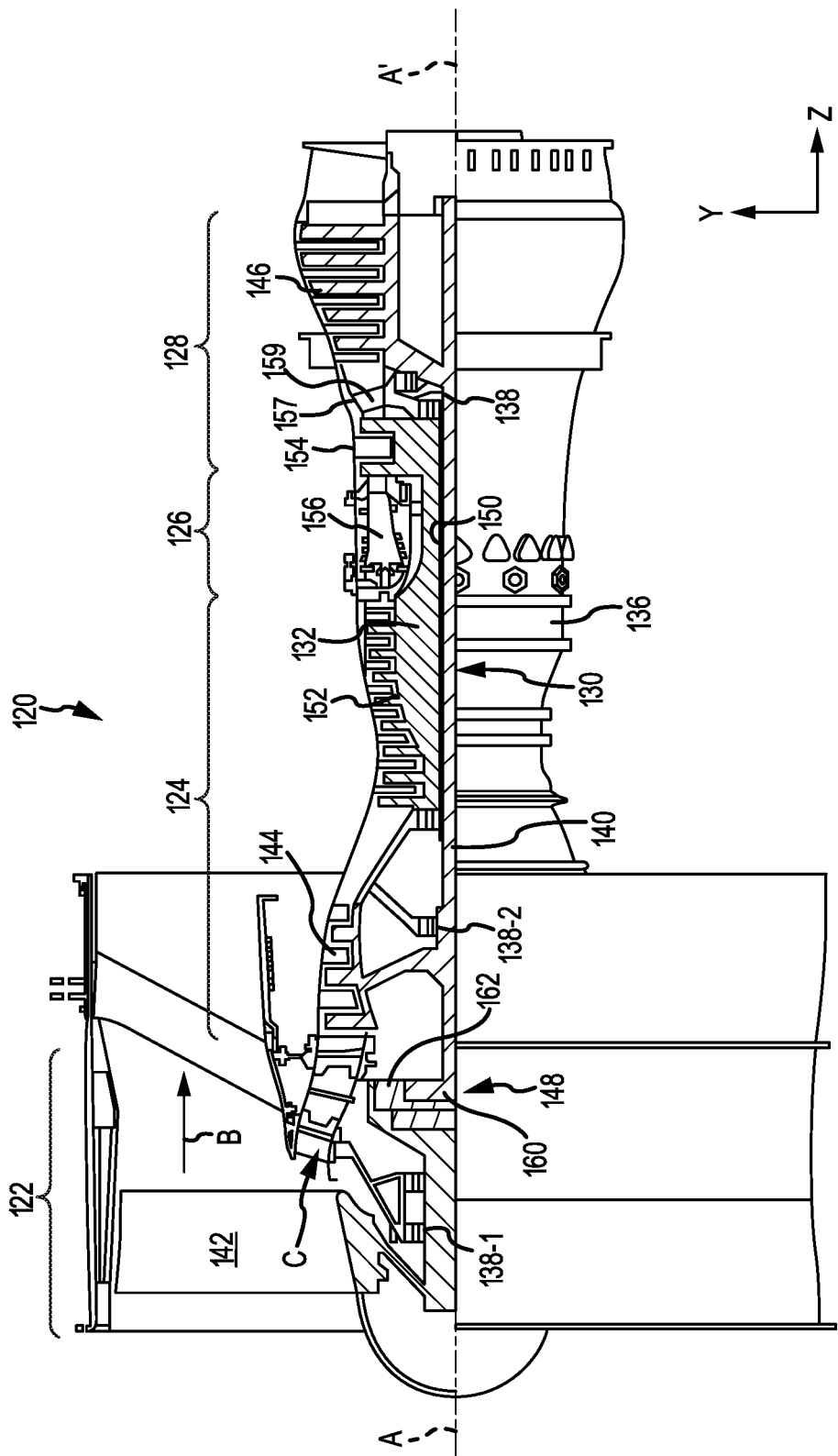
FIG. 1 illustrates a cross-section view of a gas turbine engine, in accordance with various embodiments.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2:
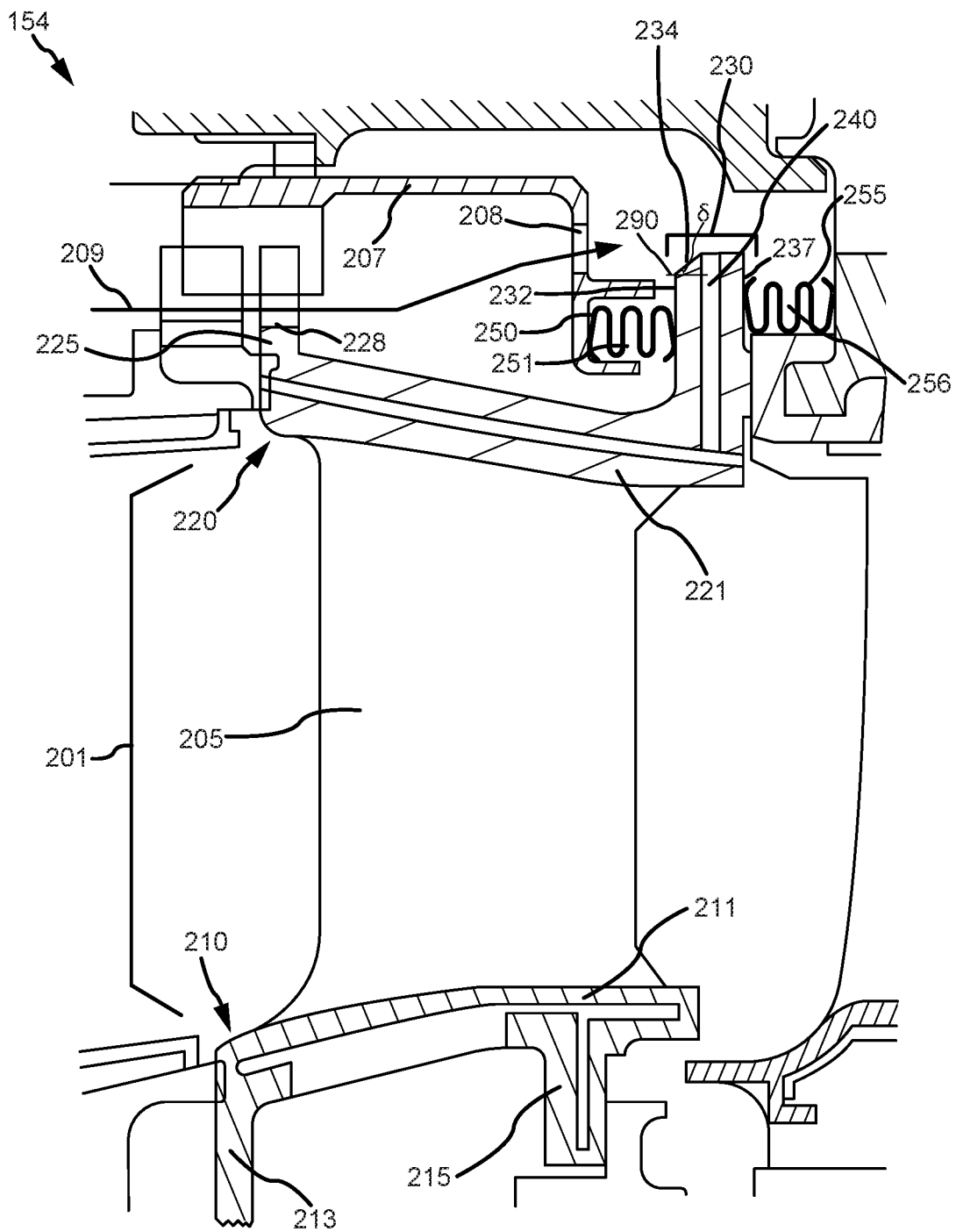
FIG. 2 illustrates a cross-section view of a high pressure turbine section of a gas turbine engine comprising a chamfered stator vane rail, in accordance with various embodiments.

In various embodiments, and with reference to FIG. 2, a section of high pressure turbine 154 of FIG. 1 is depicted in greater detail. High pressure turbine 154 may comprise a stator vane assembly 201. Stator vane assembly 201 may comprise a stator vane 205 configured to direct airflow through high pressure turbine 154. Stator vane 205 may be coupled at a first end to inner diameter (ID) stator vane rail 210 and at a second end to outer diameter (OD) stator vane rail 220. In various embodiments, stator vane 205 may be the first forward stator vane located in high pressure turbine 154. ID stator vane rail 210 may be radially spaced apart from OD stator vane rail 220. In various embodiments, OD stator vane rail 220 may form a portion of an outer core engine structure, and ID stator vane rail 210 may form a portion of an inner core engine structure to at least partially define an annular core gas flow path through high pressure turbine 154. In various embodiments, stator vane assembly 201 may comprise multiple components wherein ID stator vane rail 210 and OD stator vane rail 220 are coupled to stator vane 205 to form stator vane assembly 201. In various embodiments, stator vane assembly 201 may comprise a single component wherein stator vane 205, ID stator vane rail 210, and OD stator vane rail 220 may also comprise a single casting. In various embodiments, stator vane 205, ID stator vane rail 210, and OD stator vane rail 220 may comprise any suitable material, such as, for example, an age-hardenable, nickel-based superalloy.

In various embodiments, ID stator vane rail 210 may comprise an inner platform 211, an ID forward rail 213 and an ID aft rail 215. Inner platform 211 may be configured to couple ID stator vane rail 210 to stator vane 205. ID forward rail 213 may be located forward of ID aft rail 215. ID forward rail 213 and ID aft rail 215 may be configured to direct an ID cooling airflow to provide cooling air to ID engine components (such as, for example, blade outer air seals (BOAS), vane supports, seals, cases, and/or the like). In various embodiments, OD stator vane rail 220 may comprise an outer platform 221, an OD forward rail 225 and an OD aft rail 230. Outer platform 221 may be configured to couple OD stator vane rail 220 to stator vane 205. OD forward rail 225 may be located forward of OD aft rail 230. OD forward rail 225 may comprise a forward rail aperture 228 configured to allow a cooling airflow.

In various embodiments, high pressure turbine 154 may also comprise an OD flow rail 207. OD flow rail 207 may be configured to direct a cooling airflow along the outer diameter of high pressure turbine 154. In that regard, OD flow rail 207 and OD stator vane rail 220 may define a secondary airflow path 209 to allow cooling air to flow through high pressure turbine 154 and cool OD engine components (such as, for example, an OD BOAS). The cooling air may flow through secondary airflow path 209 by passing through forward rail aperture 228, through a vane support aperture 208 in OD flow rail 207, and over OD aft rail 230.

In various embodiments, OD aft rail 230 may comprise a leading edge 232 and a trailing edge 237. Leading edge 232 may comprise an axially forward surface of OD aft rail 230 and trailing edge 237 may comprise an axially aft surface of OD aft rail 230, axially opposite of leading edge 232. In various embodiments, OD aft rail 230 may be configured to reduce recirculation of cooling air in secondary airflow path 209, and improve efficiency of cooling air provided to OD engine components (such as, for example, an OD BOAS). Reducing the recirculation of cooling air by OD aft rail 230 may mitigate thermal stress issues caused by the cooling air from secondary airflow path 209 impinging on OD aft rail 230. OD aft rail 230 may also improve airflow through secondary airflow path 209, enabling a cooling airflow having a higher pressure and cooler temperature. For example, and in various embodiments, OD aft rail 230 may provide at least a 5% to 10% increase in pressure to the cooling airflow along secondary airflow path 209.

In that regard, and in various embodiments, OD aft rail 230 may comprise a chamfered edge 234 configured to direct cooling air over the OD aft rail 230 and to OD engine components. Chamfered edge 234 may enable the cooling air to flow over OD aft rail 230 with minor interruption and/or impingement. Chamfered edge 234 may comprise a forward portion of a radially outer surface of OD aft rail 230, located between leading edge 232 and trailing edge 237. Chamfered edge 234 may be formed using any suitable technique. For example, OD aft rail 230 may be machined to form chamfered edge 234. In various embodiments, OD aft rail 230 may also be cast, additively manufactured, and/or the like to comprise chamfered edge 234.

In various embodiments, chamfered edge 234 may be oriented at an angle relative to an axis 290. Axis 290 may be oriented substantially parallel to engine central longitudinal axis A-A', and perpendicular relative to leading edge 232, from which chamfered edge 234 is oriented radially away from. In that regard, and in various embodiments, chamfered edge 234 may be oriented at a chamfered edge angle delta ("δ") relative to axis 290. Chamfered edge angle δ may be about 15° to about 60°, about 15° to about 45°, or about 45° to about 60° (wherein about in this context means +/−1°). Chamfered edge angle δ may also comprise any other angle suitable to reduce cooling air recirculation and improve efficiency of cooling air provided to OD engine components.

Figure 3A:
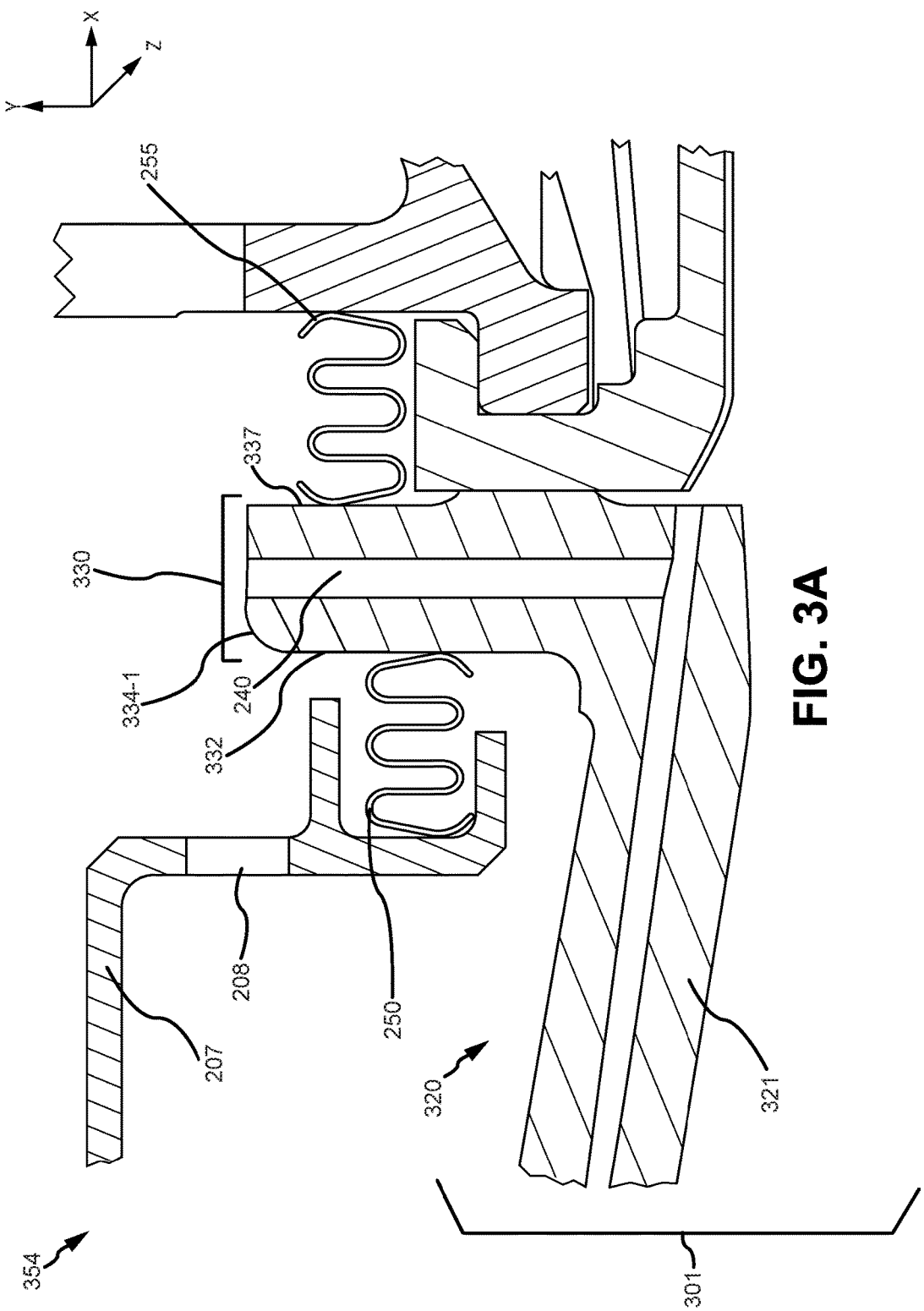
FIG. 3A illustrates a cross-section view of a high pressure turbine section of a gas turbine engine comprising a chamfered stator vane rail having a curved surface, in accordance with various embodiments.

In various embodiments, chamfered edge 234 may comprise any suitable shape capable of reducing cooling air recirculation and/or improving efficiency of cooling air provided to OD engine components. For example, chamfered edge 234 may comprise a substantially flat surface. In various embodiments, with reference to FIG. 3A, OD aft rail 330 may also comprise a chamfered edge 334-1 having a curved surface. In that regard, chamfered edge 334-1 may comprise a convex shape extending outward from engine central longitudinal axis A-A', such as, for example, a filleted surface, an oval surface, and/or the like. In various embodiments, chamfered edge 334-1 may also comprise a convex shape protruding inwards (in the y direction) with regard to engine central longitudinal axis A-A' (with brief reference to FIG. 2).

Figure 3B:
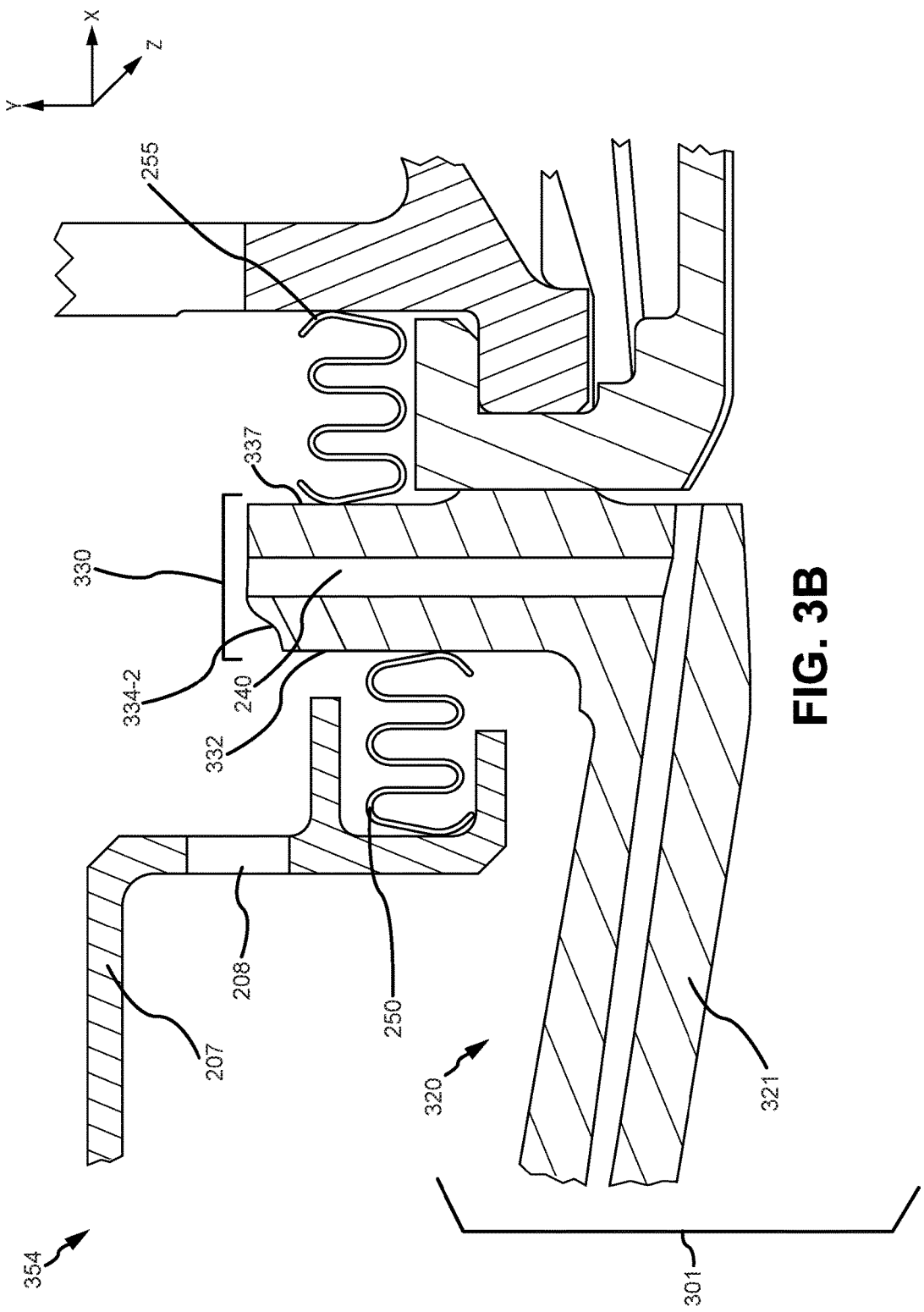
FIG. 3B illustrates a cross-section view of a high pressure turbine section of a gas turbine engine comprising a chamfered stator vane rail having a sinusoidal surface, in accordance with various embodiments.

In various embodiments, and with reference to FIG. 3B, chamfered edge 334-2 may also comprise a sinusoidal surface. In that regard, the sinusoidal surface of chamfered edge 334-2 may comprise a sinusoidal shape varying in depth (varying positive and negative in the y direction) when moving forward and aft in the x direction across OD aft rail 330.

Figure 3C:
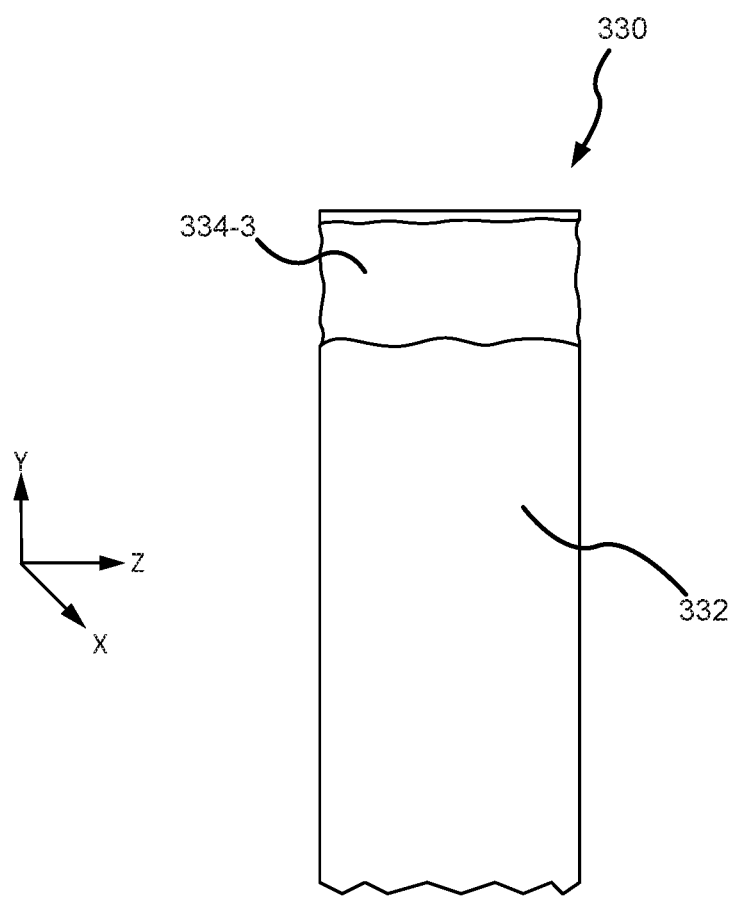
FIG. 3C illustrates a front cross-section view of a chamfered stator vane rail having a bow tied surface, in accordance with various embodiments.

In various embodiments, and with reference to FIG. 3C, chamfered edge 334-3 may also comprise a bow tied surface (or a compound surface). In various embodiments, the bow tied surface of chamfered edge 334-3 may be configured to account for rotation of OD aft rail 330 and/or OD stator vane rail 320 during gas turbine engine operation. In that regard, the bow tied surface of chamfered edge 334-3 may comprise variable depths (varying positive and negative in the y direction) when moving forward and aft in both the z direction and the x direction across OD aft rail 330. The bow tied surface may therefore comprise a compound surface having variable depths (varying positive and negative in the y direction) across multiple directions (in both the z direction and the x direction).

In various embodiments, and with reference again to FIG. 2, high pressure turbine 154 may also comprise a feather seal slot 240. Feather seal slot 240 may comprise a partial trench located on an axial surface of OD aft rail 230 between leading edge 232 and trailing edge 237. In various embodiments, feather seal slot 240 may comprise a partial trench machined into OD aft rail 230. In various embodiments, OD aft rail 230 may also be cast, additively manufactured, and/or the like to comprise feather seal slot 240. Feather seal slot 240 may comprise any shape and size suitable to fit a feather seal (e.g., feather seal 445, with brief reference to FIG. 4), such as, for example, a rectangular shape.

In various embodiments, high pressure turbine 154 may also comprise an OD leading edge seal 250 and an OD trailing edge seal 255. In various embodiments, OD leading edge seal 250 may be configured to provide an improved airflow seal between OD flow rail 207 and OD aft rail 230 to reduce airflow leakage. In that regard, OD leading edge seal 250 may be disposed within an OD forward annular cavity 251 adjacent to and aft of OD flow rail 207 and forward of OD aft rail 230. OD leading edge seal 250 may form a "W" shape, and/or any other suitable shape, and may be biased outwardly from engine central longitudinal axis A-A'. The "W" shape may also enable OD leading edge seal 250 to compress when placed into OD forward annular cavity 251, further improving the seal and reducing airflow leakage. OD leading edge seal 250 may comprise any suitable material capable of sealing and/or minimizing airflow leakage, such as, for example, a nickel alloy or a nickel chromium alloy.

In various embodiments, OD trailing edge seal 255 may be configured to provide an improved airflow seal aft of OD aft rail 230 to reduce airflow leakage. In that regard, OD trailing edge seal 255 may be located aft of OD aft rail 230 and disposed within an OD aft annular cavity 256. OD trailing edge seal 255 may form a "W" shape, and/or any other suitable shape, and may be biased inwardly towards engine central longitudinal axis A-A'. The "W" shape may also enable OD trailing edge seal 255 to compress when placed into OD aft annular cavity 256, further improving the seal and reducing airflow leakage. OD trailing edge seal 255 may comprise any suitable material capable of sealing and/or minimizing airflow leakage, such as, for example, a nickel alloy or a nickel chromium alloy.

Figure 4:
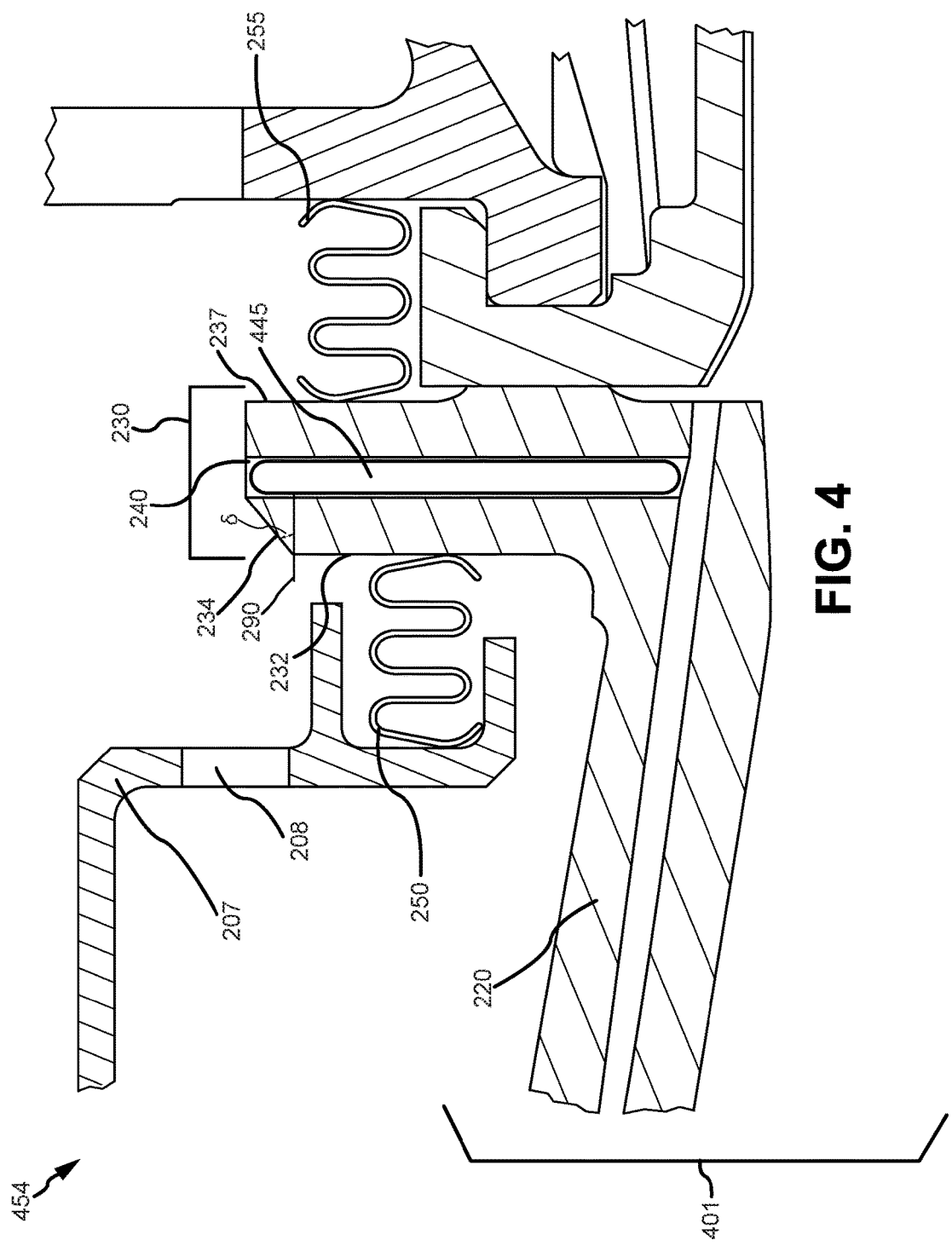
FIG. 4 illustrates a cross-section view of a high pressure turbine section of a gas turbine engine further comprising a feather seal, in accordance with various embodiments.

In various embodiments, and with reference to FIG. 4, high pressure turbine 454 may also comprise a feather seal 445. Feather seal 445 may be configured to further minimize air flow leakage in secondary airflow path 209 (with brief reference to FIG. 2). For example, and in various embodiments, feather seal 445 may be located in feather seal slot 240. The use of feather seal 445 in feather seal slot 240 may further minimize air flow leakage in the axial direction (with reference to engine central longitudinal axis A-A'). Feather seal 445 may comprise any shape, size, and material suitable to minimize air flow leakage. For example, feather seal 445 may comprise a small flat metal object, machined to size to fit within feather seal slot 240.

Figure 5:
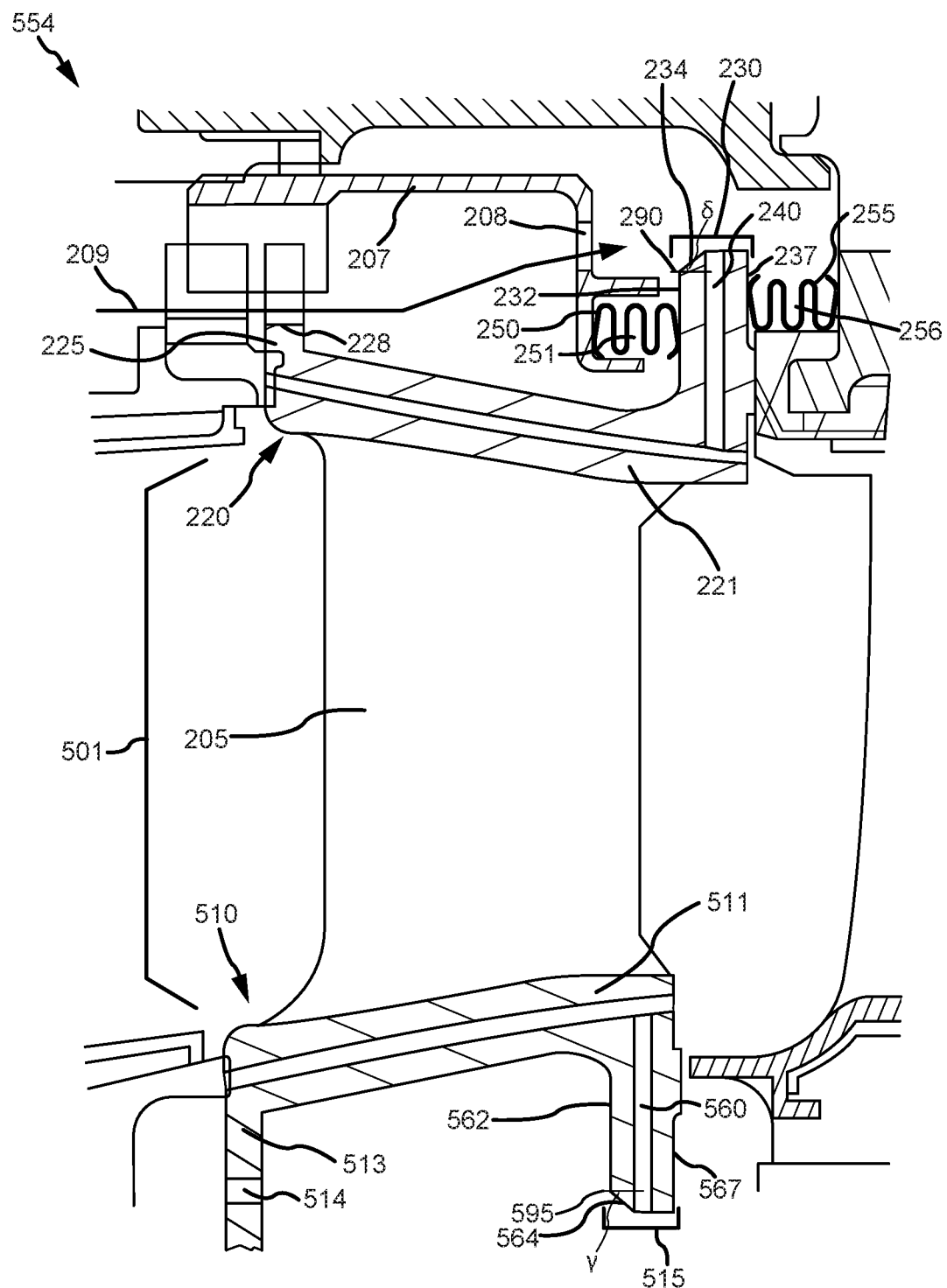
FIG. 5 illustrates a cross-section view of a high pressure turbine section of a gas turbine engine further comprising an ID chamfered stator vane rail, in accordance with various embodiments.

In various embodiments, and with reference to FIG. 5, a stator vane assembly 501 having an ID stator vane rail 510 is disclosed. ID stator vane rail 510 may comprise an inner platform 511, a ID forward rail 513, and an ID aft rail 515. ID forward rail 513 may comprise an ID forward rail aperture 514 configured to provide a cooling airflow to ID engine components. ID aft rail 515 may be similar to OD aft rail 230, and may comprise similar airflow benefits and characteristics.

In various embodiments, ID aft rail 515 may comprise an ID leading edge 562 axially forward an ID trailing edge 567. ID leading edge 562 may comprise an axially forward surface of ID aft rail 515 and ID trailing edge 567 may comprise an axially aft surface of ID aft rail 515, axially opposite of ID leading edge 562. In various embodiments, ID aft rail 515 may also comprise an ID feather seal slot 560 located between ID leading edge 562 and ID trailing edge 567. ID leading edge 562 may comprise an ID chamfered edge 564 configured to direct cooling air aft of ID aft rail 515 and to ID engine components. Chamfered edge 234 may enable a cooling air to flow over ID aft rail 515 without interruption and/or impingement. ID chamfered edge 564 may comprise a forward portion of a radially outer surface of ID aft rail 515, located between ID leading edge 562 and ID trailing edge 567.

In various embodiments, ID chamfered edge 564 may be formed using any suitable technique. For example, ID aft rail 515 may be machined to form ID chamfered edge 564. In various embodiments, ID aft rail 515 may also be cast, additively manufactured, and/or the like to comprise ID chamfered edge 564. In various embodiments, ID chamfered edge 564 may be oriented at an angle relative to an ID axis 595. ID axis 595 may be oriented substantially parallel to engine central longitudinal axis A-A', and perpendicular to ID leading edge 562, from which ID chamfered edge 564 is oriented radially away from. In that regard, and in various embodiments, ID chamfered edge 564 may be oriented at an ID chamfered edge angle gamma ("γ") relative to ID axis 595. ID chamfered edge angle γ may be about 15° to about 60°, about 15° to about 45°, or about 45° to about 60° (wherein about in this context means +/−1°). ID chamfered edge angle γ may also comprise any other angle suitable to reduce cooling air recirculation and improve efficiency of cooling air provided to ID engine components.

In various embodiments, ID chamfered edge 564 may comprise any suitable shape capable of reducing cooling air recirculation and/or improving efficiency of cooling air provided to ID engine components. For example, ID chamfered edge 564 may comprise a substantially flat surface. In various embodiments, ID aft rail 515 may also comprise an ID chamfered edge 564 having a curved surface, such as a convex shape or a concave shape. In various embodiments, ID chamfered edge 564 may also comprise a filleted surface, an oval surface, a sinusoidal surface, and/or the like. In various embodiments ID chamfered edge 564 may also comprise a bow tied surface. In that regard, the bow tied surface of ID chamfered edge 564 may comprise variable depths and heights over the circumferential and axial length of ID aft rail 515. In various embodiments, the bow tied surface of ID chamfered edge 564 may be configured to account for rotation of ID aft rail 515 and/or ID stator vane rail 510 during gas turbine engine operation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator vane rail, comprising:
   a forward rail; and
   an aft rail located axially opposite the forward rail, wherein the aft rail comprises:
   an axis defining a perpendicular direction from the aft rail;
   a leading edge;
   a trailing edge located axially opposite the leading edge; and
   a chamfered edge coupled to the leading edge, wherein the chamfered edge comprises a radially outer surface of the aft rail,
   wherein the chamfered edge comprises a bow tied surface.

2. The stator vane rail of claim 1, wherein the chamfered edge comprises a substantially flat surface.

3. The stator vane rail of claim 1, wherein the chamfered edge comprises a curved surface extending in a radial direction away from the axis.

4. The stator vane rail of claim 1, wherein the chamfered edge is oriented at an angle of about 45° to about °60 relative to the axis.

5. The stator vane rail of claim 1, wherein the chamfered edge is oriented at an angle of about 15° to about 45° relative to the axis.

6. The stator vane rail of claim 1, wherein the chamfered edge comprises a sinusoidal surface.

7. A stator vane assembly, comprising:
   a stator vane having a first end opposite a second end;
   an ID stator vane rail coupled to the first end, the ID stator vane rail comprising:
   an ID forward rail; and
   an ID aft rail located axially opposite the ID forward rail, wherein the ID aft rail comprises:
   an ID axis defining a first perpendicular direction relative to the ID aft rail;
   an ID leading edge;
   an ID trailing edge located axially opposite the ID leading edge;
   an ID chamfered edge coupled to the ID leading edge, wherein the ID chamfered edge comprises a first radially outer surface of the ID aft rail, and wherein the ID chamfered edge is oriented at a first angle of about 45° to about 60° relative to the ID axis; and
   an OD stator vane rail coupled to the second end, wherein the OD stator vane rail comprises:
   an OD forward rail; and
   an OD aft rail located axially opposite the OD forward rail, wherein the OD aft rail comprises:
   an OD axis defining a second perpendicular direction relative to the OD aft rail;
   an OD leading edge;
   an OD trailing edge located axially opposite the OD leading edge; and
   an OD chamfered edge coupled to the OD leading edge, wherein the OD chamfered edge comprises a second radially outer surface of the OD aft rail.

8. The stator vane assembly of claim 7, wherein the OD chamfered edge comprises a curved surface extending in a radial direction away from the OD axis.

9. The stator vane assembly of claim 7, wherein the OD chamfered edge is oriented at a second angle of about 45° to about 60° relative to the ID axis.

10. The stator vane assembly of claim 7, wherein the OD chamfered edge comprises a bow tied surface.

11. The stator vane assembly of claim 10, wherein the OD chamfered edge comprises a sinusoidal surface.

12. A gas turbine engine, comprising:
    a turbine section; and
    a stator vane assembly in the turbine section, the stator vane assembly comprising:
    a stator vane having a first end opposite a second end;
    an ID stator vane rail coupled to the first end;
    an OD stator vane rail coupled to the second end, wherein the OD stator vane rail comprises:
    an OD forward rail; and
    an OD aft rail located axially opposite the OD forward rail, wherein the OD aft rail comprises:
    an OD axis defining a first perpendicular direction relative to the OD aft rail;
    an OD leading edge;
    an OD trailing edge located axially opposite the OD leading edge; and
    an OD chamfered edge coupled to the OD leading edge, wherein the OD chamfered edge comprises a first radially outer surface of the OD aft rail, wherein the OD chamfered edge comprises a bow tied surface.

13. The gas turbine engine of claim 12, wherein the ID stator vane rail comprises:
   an ID forward rail; and
   an ID aft rail located axially opposite the ID forward rail, wherein the ID aft rail comprises:
      an ID axis defining a second perpendicular direction relative to the ID aft rail;
      an ID leading edge;
      an ID trailing edge located axially opposite the ID leading edge;
      an ID chamfered edge coupled to the ID leading edge, wherein the ID chamfered edge comprises a second radially outer surface of the ID aft rail, and wherein the ID chamfered edge is oriented at an angle of about 45° to about 60° relative to the ID axis.

14. The gas turbine engine of claim 12, wherein the OD chamfered edge comprises a curved surface.

15. The gas turbine engine of claim 12, wherein the OD chamfered edge is oriented at an angle of about 45° to about 60° relative to the OD axis.

16. The gas turbine engine of claim 12, further comprising an OD leading edge seal located forward the OD leading edge.

17. The gas turbine engine of claim 12, further comprising an OD trailing edge seal located aft the OD trailing edge.

* * * * *